US007483452B2

(12) United States Patent
Enari et al.

(10) Patent No.: US 7,483,452 B2
(45) Date of Patent: Jan. 27, 2009

(54) METHOD AND APPARATUS FOR SENDING OUT MULTI-CHANNEL DIGITAL DATA, METHOD AND APPARATUS FOR PROGRAMMING THE INFORMATION AND METHOD AND APPARATUS FOR MANAGING MULTI-CHANNEL DIGITAL DATA

(75) Inventors: Masahiko Enari, Kanagawa (JP); Yasuo Ono, Kanagawa (JP); Hisanao Ito, Kanagawa (JP)

(73) Assignees: Sony Corporation, Tokyo (JP); Kabushiki Kaisha Toshiba, Kanagawa (JP)

( * ) Notice: Subject to any disclaimer, the term of this patent is extended or adjusted under 35 U.S.C. 154(b) by 607 days.

(21) Appl. No.: 11/150,646

(22) Filed: Jun. 10, 2005

(65) Prior Publication Data
US 2005/0233694 A1 Oct. 20, 2005

Related U.S. Application Data

(62) Division of application No. 09/242,814, filed on Jun. 25, 1999, now Pat. No. 6,931,021.

(51) Int. Cl.
| H04L 12/24 | (2006.01) |
| H04H 60/00 | (2008.01) |
| H04H 60/56 | (2008.01) |
| G05B 19/00 | (2006.01) |
| H04J 3/00 | (2006.01) |

(52) U.S. Cl. .................. 370/537; 370/428; 370/486; 709/223; 709/224

(58) Field of Classification Search ............. 370/250, 370/310, 316, 321, 345, 347, 412, 414, 428, 370/442, 466, 486, 498, 537, 913; 340/825.24, 340/825.25; 381/77, 80; 709/223, 224; 707/204
See application file for complete search history.

(56) References Cited

U.S. PATENT DOCUMENTS
4,410,911 A * 10/1983 Field et al. .................. 380/238
(Continued)

FOREIGN PATENT DOCUMENTS
JP 64 88981 4/1989
(Continued)

OTHER PUBLICATIONS

Merchant A et al: "Hierarchical storage servers for video on demand: feasibility, design and sizing," Global Telecommunications Conference, 1996. Globecom'96. Communications: The Key to Global Prosperity, London, UK Nov. 18-22, 1996, New York, NY, USA, IEEE, US, Nov. 18, 1996, ISBN: 0-7803-3336-5.

(Continued)

*Primary Examiner*—Chi H Pham
*Assistant Examiner*—Ahmed Elallam
(74) *Attorney, Agent, or Firm*—Frommer Lawrence & Haug LLP; William S. Frommer; Paul A. Levy

(57) ABSTRACT

An information source management system 11 performs inventory management for CDs and a material information management progress programming system 12 performs programming. An material information registration system 13 compresses the musical numbers of the CDs for holding on a proprietary server and a proprietary server 121 of a multi-channel sending-out system 101. A large number of materials are held on the proprietary server 121 and read out from it. The read-out materials are converted in its format to a transmission format by a sending-out server 123 so as to be multiplexed by a multiplexer 141. The multiplexed data is QPSK-modulated by a modulator 142 and sent out via a selector 143. From the proprietary server 121 are read out data which is sent out via dedicated network 3 to a live PC where it is reproduced. This data is furnished again via dedicated network 3 and encoded by an MPEG encoder 129 so as to be sent out at the sending-out server 123.

3 Claims, 10 Drawing Sheets

U.S. PATENT DOCUMENTS

| | | | |
|---|---|---|---|
| 5,144,438 A * | 9/1992 | Kim | 725/56 |
| 5,214,792 A | 5/1993 | Alwadish | 455/45 |
| 5,283,639 A | 2/1994 | Esch et al. | |
| 5,566,353 A | 10/1996 | Cho et al. | |
| 5,589,947 A | 12/1996 | Sato et al. | 386/96 |
| 5,646,603 A | 7/1997 | Nagata et al. | 340/825.25 |
| 5,659,653 A | 8/1997 | Diehl et al. | 386/46 |
| 5,678,042 A * | 10/1997 | Pisello et al. | 714/47 |
| 5,692,214 A * | 11/1997 | Levine | 710/13 |
| 5,777,997 A | 7/1998 | Kahn et al. | 370/493 |
| 5,815,471 A | 9/1998 | Mince et al. | 700/234 |
| 5,825,829 A * | 10/1998 | Borazjani et al. | 375/308 |
| 5,831,662 A * | 11/1998 | Payton | 725/122 |
| 5,899,699 A | 5/1999 | Kamiya | 434/307 A |
| 5,931,906 A | 8/1999 | Fidelibus et al. | 709/217 |
| 5,959,945 A | 9/1999 | Kleiman | 381/81 |
| 6,088,351 A | 7/2000 | Jenkin et al. | 370/347 |
| 6,249,771 B1 | 6/2001 | Kurihara | 705/26 |
| 6,300,880 B1 | 10/2001 | Sitnik | 340/825.25 |
| 6,738,978 B1 | 5/2004 | Hendricks et al. | 725/35 |
| 2003/0135867 A1 * | 7/2003 | Guedalia | 725/126 |
| 2007/0113094 A1 * | 5/2007 | Moskowitz et al. | 713/176 |

FOREIGN PATENT DOCUMENTS

| | | |
|---|---|---|
| JP | 1 256087 | 10/1989 |
| JP | 1-265675 | 10/1989 |
| JP | 3 8191 | 1/1991 |
| JP | 4 19886 | 1/1992 |
| JP | 4-248776 | 9/1992 |
| JP | 4-273627 | 9/1992 |
| JP | 5 347082 | 12/1993 |
| JP | 6 303520 | 10/1994 |
| JP | 7-231308 | 8/1995 |
| JP | 7-240729 | 9/1995 |
| JP | 8-56204 | 2/1996 |
| JP | 8-228180 | 9/1996 |
| JP | 8 317338 | 11/1996 |
| JP | 9-18753 | 1/1997 |
| JP | 9-55880 | 2/1997 |
| JP | 9-97136 | 4/1997 |
| JP | 9 98407 | 4/1997 |
| JP | 9 121338 | 5/1997 |
| JP | 9-149356 | 6/1997 |
| JP | 9 200687 | 7/1997 |
| JP | 11 45554 | 2/1999 |
| WO | WO 97 06637 | 2/1997 |

OTHER PUBLICATIONS

Boutall H W et al. "Automatic and Remote Control of Broadcast Television and Radio Transmitting Stations", Proceedings of the Institution of Electrical Engineers, Institution of Electrical Engineers, Stevenage, GB, vol. 126, No. 11R, Nov. 1979, pp. 1069-1096, XP000761816 ISSN: 0020-3270.

* cited by examiner

CONFIGURATION SETTING AND REFFRENCE

| ITEM | SETTING | REFERENCE |
|---|---|---|
| COMMON TIME | SWITCH | FORMATION, OWNING, SEND-OUT, MXC, OA MONITOR |
| BIT RATE TABLE | SWITCH | FORMATION, SEND-OUT |
| CHANNEL COMBINATION TABLE | SWITCH | SEND-OUT, MXC |
| CURRENT MUX USE STATE | SWITCH | MXC |
| PMT | MXC | SEND-OUT |
| SERVICE TABLE | SWITCH | SEND-OUT, MXC |

METHOD AND APPARATUS FOR SENDING OUT MULTI-CHANNEL DIGITAL DATA, METHOD AND APPARATUS FOR PROGRAMMING THE INFORMATION AND METHOD AND APPARATUS FOR MANAGING MULTI-CHANNEL DIGITAL DATA

This is a divisional application of U.S. application Ser. No. 09/242,814, filed Jun. 25, 1999 now U.S. Pat. No. 6,931,021, all of which is incorporated herein by reference.

TECHNICAL FIELD

This invention relates to a method and apparatus for sending out multi-channel digital data, a method and apparatus for programming the information and a method and apparatus for managing multi-channel digital data.

BACKGROUND ART

Recently, the technique for digitizing, compressing and transmitting the information has been put to practical use. This enables musical numbers for e.g., 100 channels to be broadcast to respective households via a broadcasting satellite, so that the households can suitably select and enjoy desired musical numbers.

In making this broadcast, a large number of musical information items need to be recorded on a recording medium in advance. The musical information items recorded thereon are optionally read out for broadcast.

However, if the information of the numerous channels it to be transmitted, the CDs are reproduced on 100 compact disc players, and the resulting reproduced outputs are encoded by 100 encoders to generate data to be broadcast for temporary recording the generated data on a recording medium. This recording medium is reproduced for broadcast. Thus, for making this broadcast, it is necessary to prepare in advance a large number of magnetic tapes having the musical information for 100 channels recorded thereon.

The result is that significant time and labor are consumed for broadcasting the musical information for 100 channels, such that it is difficult to make automatic and efficient broadcast by a smaller number of operators. Moreover, it is not that easy to change the broadcast contents arbitrarily.

That is, since it is now possible to broadcast the information over a large number of channels, the information programming operation also needs to be carried out efficiently prior to broadcasting the information. However, in a conventional programming apparatus, the information programming operation is time-consuming such that it is difficult to edit the information over numerous channels in a short time.

Moreover, in a conventional broadcasting system, simply musical numbers are broadcast, such that it is difficult to broadcast the resources of the musical numbers in an organically coordinated form suitable for live broadcast.

In addition, since the information can now be broadcast over an extremely large number of channels, the entire system is affected significantly by malfunctioning of a sole apparatus. Thus, there arises the necessity for promptly finding and repairing an apparatus that is in disorder.

If the number of channels is increased, the capacity of the recording medium is necessarily increased, as a result of which the apparatus is increased in size and cost.

DISCLOSURE OF THE INVENTION

In view of the above-depicted status of the art, it is an object of the present invention to enable a large number of information items to be automatically and efficiently broadcast by a smaller number of operators and in a short time and to enable the broadcast contents to be changed easily.

That is to say, it is another object of the present invention to provide a multi-channel data sending-out method and apparatus whereby a large number of materials can be automatically and efficiently sent out as digital data In view of the above-depicted status of the art, the present invention contemplates to render it possible not only to broadcast the multi-channel musical numbers of channels but also to combine the resources provided therefor organically even for live broadcast for utilization thereof.

That is to say, it is a further object of the present invention to provide a multi-channel data sending-out method and apparatus whereby not only the musical numbers held in store are read out and broadcast but also the musical numbers thus read out can be organically utilized for live broadcast.

In view of the above-depicted status of the art, the present invention also contemplates to enable the effect of malfunctions of part of the system broadcasting on an extremely large number of channels to be minimized on occurrence of such malfunctions.

That is to say, it is a further object of the present invention to provide a multi-channel data sending-out method and apparatus whereby malfunctions can be detected promptly and reliably.

In this connection, it is a further object of the present invention to provide a multi-channel data sending-out method and apparatus whereby the effect of a malfunction can be minimized on occurrence thereof.

In view of the above-depicted status of the art, the present invention also contemplates to facilitate the programming operation for musical numbers the can be broadcast within a preset time duration.

Specifically, it is a further object of the present invention to provide an information programming method and apparatus whereby the information of a large number of channels can be efficiently edited in a short time duration.

It is yet another object of the present invention to provide a method and apparatus for supervising multi-channel digital data whereby, in view of the status of the art the an increased number of channels leads to an increased size of the apparatus and cost, a supervising apparatus of a small size and low cost can be realized.

With the multi-channel digital data sending-out method and apparatus according to the present invention, various processing operations, such as management information of the information source, information of the materials to be sent out, progress programming for materials to be sent out, registration of the source materials to be sent out, storage of plural materials and sending out of the plural stored materials, are correlated with one another so that the voluminous information can be broadcast automatically efficiently in a short time, while the aired contents can be modified easily.

Thus, in its one aspect, the present invention provides a multi-channel digital data sending-out apparatus including management means for supervising the information of an information source, programming means for supervising the information of the material being sent and programming the progress of data to be sent out, registering means for registering the information of the materials to be sent out, holding means for holding a plurality of the materials, sending-out means for sending out the plural materials held by the holding means to a transmission path as a multi-channel digital data, and connection means for interconnecting the management means, programming means, registering means, holding means and the sending-out means to permit each of these means to access an other of the means.

In another aspect, the present invention provides a multi-channel digital data sending-out method including a management step for supervising the information of an information source, a programming step for supervising the information of the material being sent and programming the progress of the data to be sent out, a registering step for registering the information of the material to be sent out, a holding step for holding a plurality of the materials, a sending-out step for sending out the plural materials held by the holding means to a transmission path as multi-channel digital data, and a connection step for interconnecting the processing operations of the management step, programming step, registering step, holding means and the sending-out step so that the processing operation at each of the steps will be associated with the processing operation at an other of the steps.

In the multi-channel digital data sending-out method and apparatus according to the present invention, the respective means or steps are interconnected with one another, so that the processing at each means or step can be correlated with other means or steps to render it possible to send out the voluminous information as digital data automatically efficiently with a relatively small number of operators to assure facilitated change of the sent-out data.

Also, in the multi-channel digital data sending-out method and apparatus according to the present invention, the format of plural stored materials is converted to a transmission format so as to be sent out as multi-channel digital data to the transmission channel. In addition, when the stored materials are read out and reproduced, these are encoded in real-time and have the format converted to the transmission format, so that the materials are sent out to the transmission path as multi-channel digital data. This enables musical numbers of plural channels to be aired, while the resources provided therefor can be organically combined and utilized in live broadcast.

In a further aspect, the present invention provides a multi-channel digital data sending-out apparatus including holding means for holding a plurality of materials to be sent out, reproducing means for reading out and reproducing the materials held by the holding means, encoding means for real-time encoding the materials reproduced by the reproducing means, conversion means for converting the format of the plural materials held by the holding means or the plural materials encoded in real-time by the encoding means into a format for transmission, sending-out means for sending out the materials converted by the conversion means to the transmission path as multi-channel digital data and connection means for interconnecting the holding means, reproducing means; encoding means, conversion means and sending-out means to permit each of these means to access an other of the means.

In a further aspect, the present invention provides a multi-channel digital data sending-out method including a holding step for holding a material to be sent out, a reproducing step for reading out and reproducing the material held by the holding step, an encoding step for real-time encoding the material reproduced by the reproducing step, a conversion step for converting the format of the plural materials held by the holding means or the plural materials encoded in real-time by the encoding step into a format for transmission, a sending-out step for sending out the materials converted by the conversion step to the transmission path as multi-channel digital data, and a connection step for interconnecting the processing operations of the holding step, reproducing step, encoding step, conversion step, and the sending-out step so that the processing operation at each of the steps will be associated with the processing operation at an other of the steps.

Thus, with the sending method and apparatus for multi-channel digital data according to the present invention, the stored material has its format subsequently converted into the format for transmission and sent out as multi-channel digital data to the transmission route. Moreover, when read out and reproduced, the stored material is encoded and the encoded material has its format converted to the transmission format so as to be sent out to the transmission path as multi-channel digital data. Thus, not only can the stored material be sent out as multi-channel digital data to the transmission channel, but the sent-out data can be organically utilized for live broadcasting.

Also, with the multi-channel digital data sending-out method and apparatus according to the present invention, it is possible to detect malfunctioning sites promptly and reliably by monitoring the stored materials, converted materials and the sent-out materials.

In a further aspect, the present invention provides a multi-channel digital data sending-out apparatus including holding means for holding a plurality of materials to be sent out, conversion means for converting the format of the plural materials held by the holding means into a format for transmission, a sending-out step for sending out the materials converted by the conversion step to the transmission path as multi-channel digital data, monitoring means for monitoring materials read out from the holding means, materials converted by the conversion means or materials sent out by the sending-out means and supplying means for supplying the materials read out from the holding means, materials converted by the conversion means or materials sent out by the sending-out means.

In a further aspect, the present invention provides a multi-channel digital data sending-out method including a holding step for holding a plurality of materials to be sent out, a conversion step for converting the format of the plural materials held by the holding step into a format for transmission, a sending-out step for sending out the materials converted by the conversion step to the transmission path as multi-channel digital data, a monitoring step for monitoring materials read out from the holding step, materials converted by the conversion step or materials sent out by the sending-out step and a supplying step for supplying the materials read out from the holding step, materials converted by the conversion step or materials sent out by the sending-out step.

In the multi-channel digital data sending-out method and apparatus according to the present invention, since the stored material, converted material or the sent-out material is monitored, it is possible to detect the malfunctioning site promptly and reliably.

Also, in the multi-channel digital data sending-out method and apparatus according to the present invention, the required information can be retrieved from the stored information to monitor the site of failure or error to minimize its adverse effect.

In a further aspect, the present invention provides a multi-channel digital data sending-out apparatus including programming means for supervising the information of a material to be sent out, programming the data to be sent out as to its progress and for generating the progress information, holding means for holding the information on the materials, the progress information and any other information necessary for sending out the materials, conversion means for converting the format of the plural materials into a format for transmission, sending-out means for sending out the plural materials converted by the conversion means to the transmission path as multi-channel digital data and monitoring means for monitoring the programming means, conversion means or the sending-out means as to malfunctioning thereof so that the information held by the holding means and which is currently required will be supplied to the programming means, conversion means or the sending-out means.

In a further aspect, the present invention provides a multi-channel digital data sending-out method including a programming step for supervising the information of a material to be sent out, programming the data to be sent out as to its progress and for generating the progress information, a holding step for holding the information on the materials, the progress information and any other information necessary for sending out the materials, a conversion step for converting the format of the plural materials at the holding step into a format for transmission, a sending-out step for sending out the plural materials converted by the conversion means to the transmission path as multi-channel digital data and a monitoring step for monitoring errors in the steps so that, if errors occur in the processing in any of the above steps, the information held in the holding step and which is currently required will be presented for and utilized in processing in each of the steps.

In the multi-channel digital data sending-out method and apparatus according to the present invention, malfunctions in the respective means or errors in the respective steps are monitored so that the required information among the different items of the stored information will be supplied to the respective steps for use in the relevant processing. Thus, on occurrence of malfunctions or errors, these can be coped with promptly to suppress their effects.

With the information programming method and apparatus according to the present invention, the uniform interval time duration between the uniform information items are computed from the playback time of the information, number of the intervals and the sending-out time and the results thus found can be compared to the upper or lower limit values of the intervals as set to enable efficient programming of the information items of a large number of channels in a shorter time.

Thus, in a further aspect, the present invention provides an information programming apparatus including decision means for deciding plural information items to be sent out within a pre-set time, setting means for setting at least one of an upper limit value or a lower limit value of an interval time duration between one information item and another information item, calculating means for calculating a uniform interval time duration from the playback time of the information, number of the interval time durations and the sending-out time and comparison means for comparing the results of calculations by the calculation means to the upper or lower limit value as set by the setting means.

In a further aspect, the present invention provides an information programming method including a decision step for deciding plural information items to be sent out within a pre-set time, a setting step for setting at least one of an upper limit value or a lower limit value of an interval time duration between one information item and another information item, a calculating step for calculating a uniform interval time duration from the playback time of the information, number of the interval time durations and the sending-out time and a comparison step for comparing the results of calculations by the calculation step to the upper or lower limit value as set by the setting means.

With the information programming method and apparatus of the present invention, in which the uniform interval time duration is calculated from the playback time of the information, number of the interval time durations and the information sending-out time, and the results of calculations are compared to the upper or lower limit value as set, the information that can be sent out within a pre-set sending-out time interval can be programmed easily an reliably.

Moreover, if, with the information programming method and apparatus of the present invention, the archiving condition is set, the material satisfying the conditions can be detected and archived from the plural stored materials to enable the realization of the small-sized low-cost apparatus.

That is, in a further aspect of the present invention, there is provided a multi-channel digital data management apparatus including holding means for holding a plurality of materials to be sent, sending-out means for sending out the plural materials held on the holding means to a transmission path as multi-channel digital data, setting means for setting archiving conditions, detection means for detecting, from the plural materials held by the holding means, the materials satisfying the conditions set by the setting means, means for archiving the materials detected by the detection means, and means for interconnecting the holding means, sending-out means, setting means, detection means, and the archiving means.

In yet another aspect of the present invention, there is provided a multi-channel digital data management method including a holding step for holding a plurality of materials to be sent, a sending-out step for sending out the plural materials held on the holding step to a transmission path as multi-channel digital data, a setting step for setting archiving conditions, a detection step for detecting, from the plural materials held by the holding step, the materials satisfying the conditions set by the setting step, a step for archiving the materials detected by the detection step and a step for interconnecting the holding step, sending-out step, setting step, detection step and the archiving step so that a processing operation by each of the steps will be associated with the processing operation by other steps.

Thus, with the management method and apparatus for multi-channel digital data according to the present invention, the stored plural materials satisfying the set conditions are detected and archived, and the capacity for storage can be reduced as compared to that to be archived to reduce the size and cost of the apparatus.

BEST MODE FOR CARRYING OUT THE INVENTION

Figure 1:
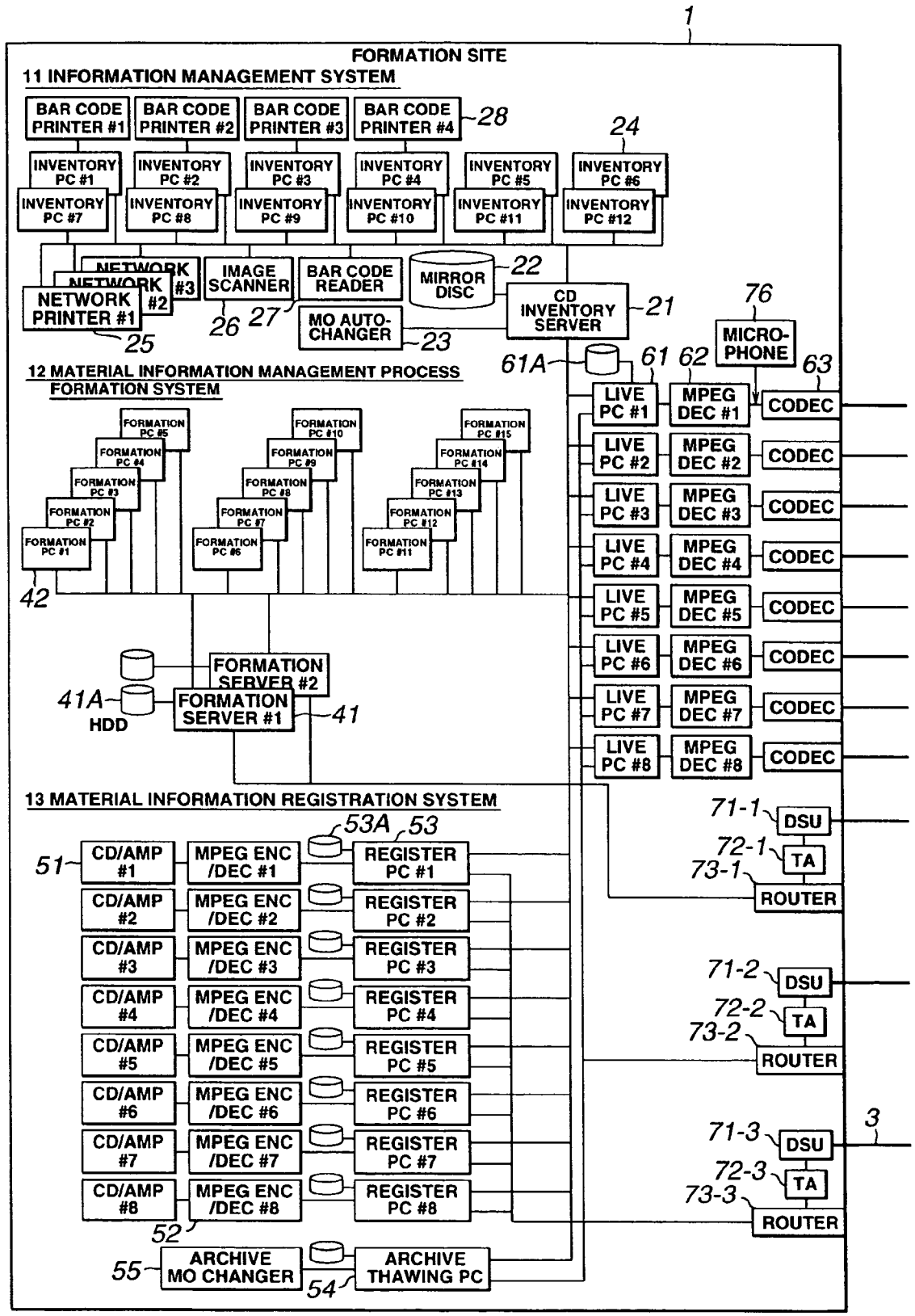
FIG. 1 is a block diagram showing an illustrative structure of an programming site embodying the present invention.

Referring to the drawings, preferred embodiments of the present invention will be explained in detail.

Figure 2:
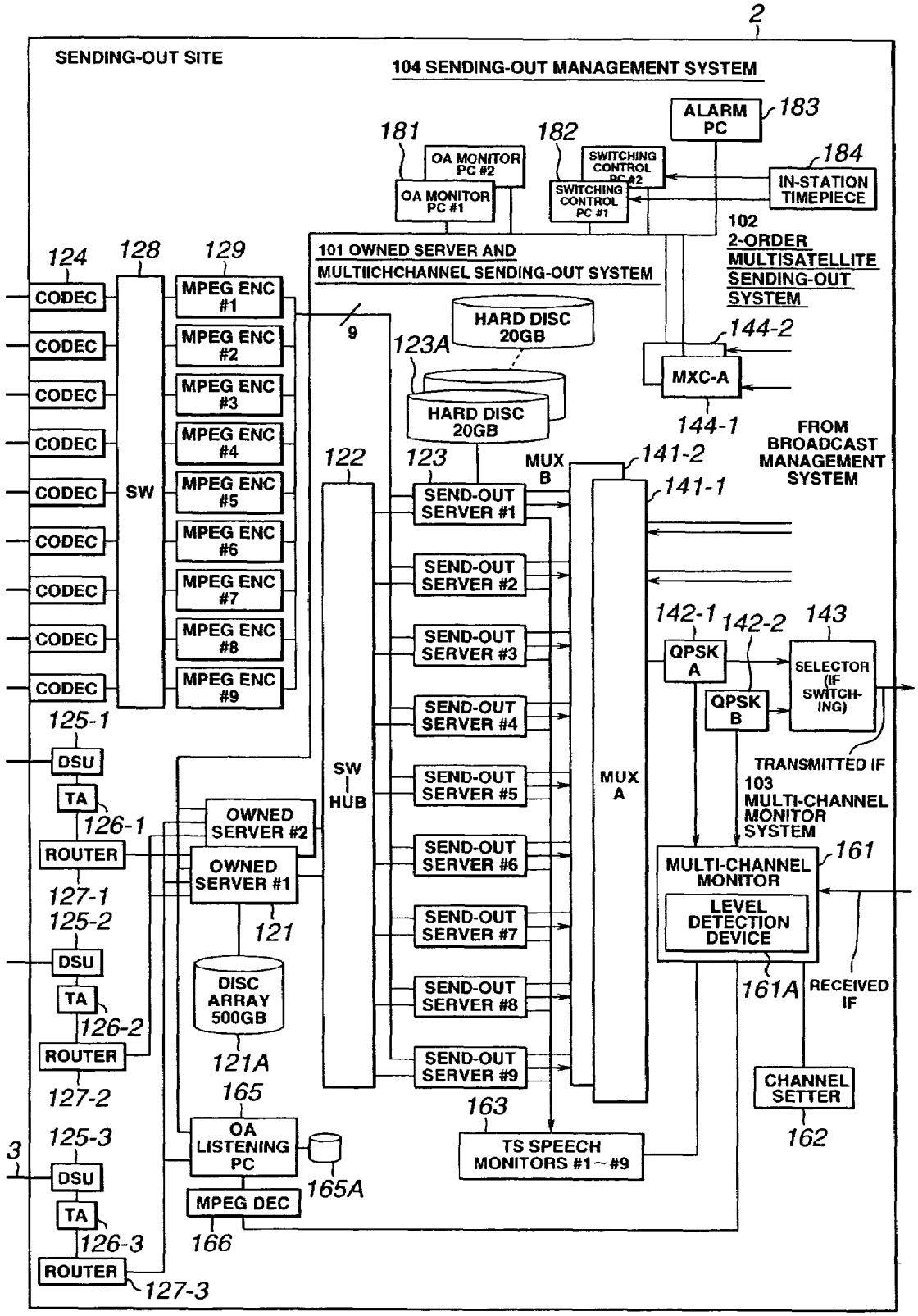
FIG. 2 is a block diagram showing an illustrative structure of a sending-out side embodying the present invention.
Figure 3:
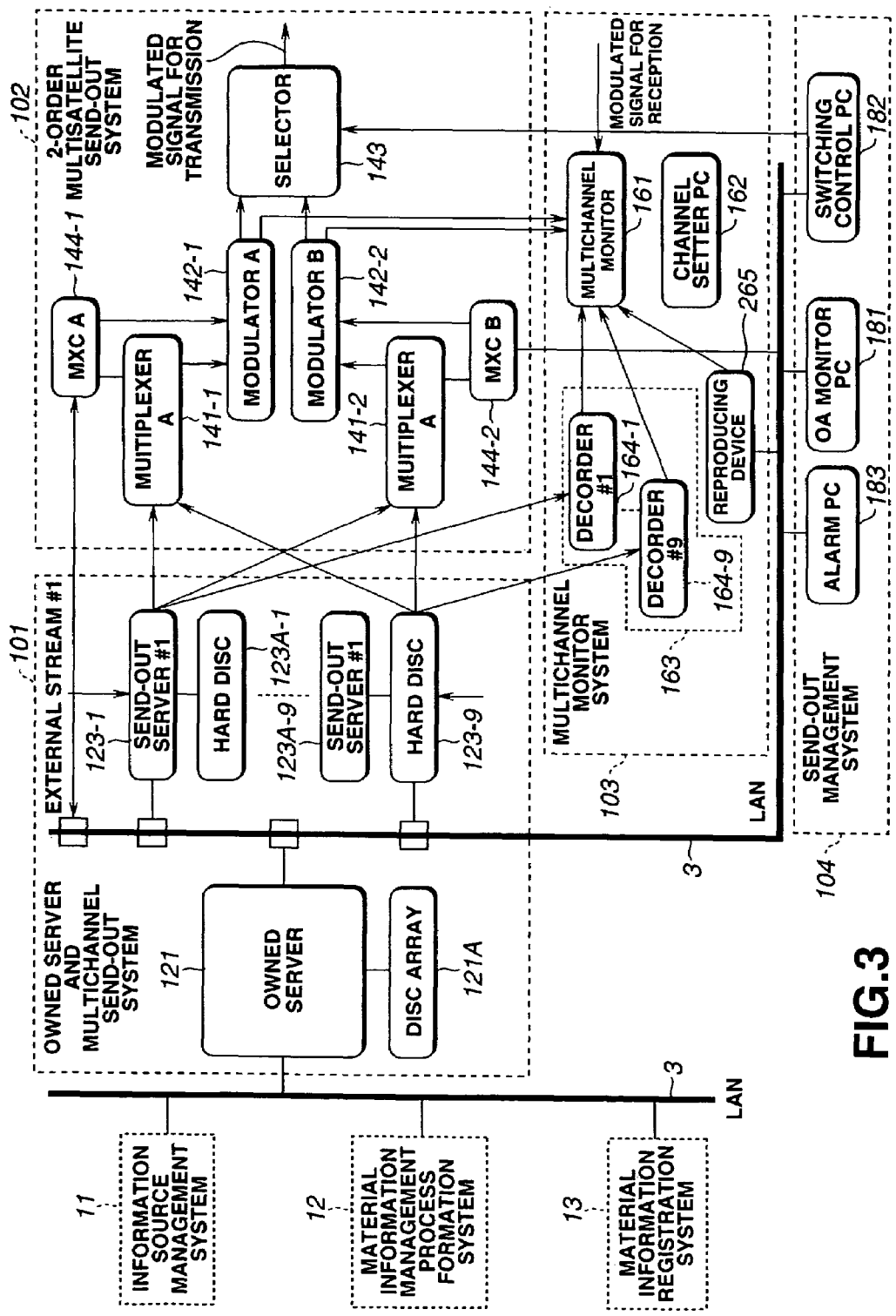
FIG. 3 is a block diagram showing the state of interconnection of main portions shown in FIGS. 1 and 2.

FIGS. 1 to 3 illustrates an embodiment o the present invention. Specifically, FIG. 1 shows the structure of the programming site 1, FIG. 2 mainly shows the structure of a sending-out site 2 and FIG. 3 shows the state of interconnection between the two by the structure of main components. The system shown herein is an automated digital broadcasting system for digital broadcasting of musical files (digital data) compressed in accordance with the MPEG (Moving Picture Experts Group) system by a sole satellite relaying unit (transponder) over 100 channels. In the present application, the term "system" is used to mean an overall apparatus constituted by plural apparatus.

The present system is made up of the programming site 1 for producing broadcast programs and the sending-out site 2 for sending out the program, these two sites being interconnected by a dedicated network 3 such as local area network (LAN). The programming site 1 includes an information source management system 11, a material information management progress programming system 12 and a material information registration system 13. The sending-out site 2 includes an owned server and multichannel sending out system 101, a second-order multiple satellite sending out system 102, a multi-channel monitoring system 103 and a sending-out management system 104.

Since the present system broadcasts musical numbers to each user over a satellite, a CD is used as an information source. The information source management system 11 takes charge of management of this CD, that is a medium, and musical numbers recorded in the CD as the sound source. Thus, the information source management system 11 has a CD inventory management server 21. To this CD inventory management server 21 are connected a hard disc (mirror disc) 22 and a MO auto-changer 23. The hard disc 22 and the MO auto-changer 23 drive a MO disc on which the necessary information is recorded to constitute a database.

To the CD inventory management server 21 are connected 12 inventory supervising personal computers 24. In the present application, if is necessary to distinguish these inventory supervising PCs from one another, the individual PCs are referred to as inventory supervising PCs 24-1 to 24-12, whereas, if there is no particular necessity for distinguishing the PCs, these are referred to simply as the inventory supervising PCs 24.

The information source management system 11 also includes three network printers 25-1 to 25-3, an image scanner 26, a bar code reader 27 and four bar code printers 28-1 to 28-4. The network printer 25 is used for printing various documents. The bar code printer 28 is used to print out bar codes attached to the CDs being managed. The bar code reader 27 is used to read out the bar code attached to the CD. Finally, the image scanner 26 is used to retrieve musical notes, lyrics and the like information annexed to the CD.

The totality of the information concerning the CDs is stored in a database of the hard disc 22. The CD inventory management is carried out in the following manner.

1. A CD inventory supervisor registers the information on CD ordering request information from the inventory supervising PC 24 to the CD inventory management server 21 and sends a CD ordering card to the seller to place an order. The CD ordering card is outputted by the server 21 via network printer 25.
2. When the CD is warehoused, the CD inventory supervisor registers the inventory information from the inventory supervising PC 24 to input the entire information on the CD medium necessary for retrieval for inventory management and the entire information concerning the musical numbers (resources) recorded on the CD to the database of the CD inventory management server 21. This information encompasses the information entered as text, such as title, name of an artist, time, genre or keyword, and a jacket image entered by the image scanner 26. There are other information items such as the detailed information on the lyrics, albums, or the musical numbers, and the information entered as electronic data, such as photos, MIDI data or the karaoke singing start timing. The input information is pertinent to the albums (entire CD musical numbers) and the musical numbers and is not inclusive of the management information or hysteresis information on sending out and broadcasting. These are registered in a programming server 41, as will be explained subsequently.
3. The CD inventory management server 21 stores the information in the hard disc 22 and issues the CD medium management number in the order of acceptance to issue a bar code label from the bar code printer 28.
4. The CD inventory supervisor houses the CDs in a supervising shelf in the order of the CD medium management number.
5. The CD user goes to a reception of the information source management system 11 to present the CD medium management number to have the CDs leased.

This information source management system 11 also has the custody of other mediums, such as DATA, compact cassettes or records.

The sole CD inventory management server 21 takes back-up copies once a week on a MO disc, by having the hard disc 22 constituted as a mirror ring structure, in order to back the information (difference) entered every day. The 12 inventory supervising PCs 24 as clients perform ordering, inventory, information inputting, retrieval and leasing. The maximum storage information volume is one million musical numbers.

The material information management progress programming system 12 is constituted by two programming servers 41-1 and 41-2 and 15 programming PCs 42-1 to 42-15 connected thereto. Each programming server 41 has a hard disc 41A. The present material information management progress programming system 12 takes charge of supervision of musical numbers used for broadcast and programming of a progress table. In this progress table, there are recorded the broadcast materials, broadcast start time and broadcast intervals. The material information of the musical numbers required for broadcast and the channel-based progress table are stored in their entirety on the hard disc 41A of the programming server 41. The material herein means musical numbers encoded by MPEG compression into a file, and the material information means the information on the material encoded in the material information registration system 13 or requested to be encoded therein and which is now required for broadcast.

The material information management and progress management occurs in the following manner. The programmer prepares the progress table of the channel he or she takes charge of from a programming PC 42.

6. The programmer retrieves the material information of the programming server 41 on the musical number he or she desires to broadcast. If the targeted material is found, the musical number is dragged into the programming frame on the graphical user interface (GUI) of the programming PC 42. The performance time of the dragged musical number is the real broadcasting time. This musical number is "recorded" on the programming frame.

7. If the programmer cannot find the targeted material on retrieving the material information of the programming server 41 in search of the musical number desired to be broadcast, he or she retrieves the CD inventory management server 21. If the targeted musical number is found, he or she drags the musical number into the programming frame on the GUI of the programming PC 42. The performance time of the dragged musical number is the time on CD inventory management and may differ from the time of the recorded musical number. Since the musical number is as yet not registered (encoded), it is "unrecorded" on the programming frame. The unrecorded musical numbers are sequentially notified to the material information registration system 13 as candidates for recording and, when thee are encoded, the "unrecorded" on the programming server 41 is changed to "recorded" on the programming server 41. At this time, the performance time of the material corresponds to the real broadcast time.

If, on retrieving the CD inventory management server 21, a targeted musical number has not been found in the programming frame, a CD ordering request is outputted to the CD inventory management server 21, after which the target musical number becomes the tentative candidate. After warehousing and CD inventory management registration, the musical number is encoded by the aforementioned processing. Ultimately, all musical numbers are "recorded" on the programming frame.

8. At a time point all musical numbers are "recorded" on the programming frame, the programmer applies matching check on the GUI of the programming PC 42. In the matching check, the materials specified in the programming frame are evenly allocated to check automatically whether or not the reproducing time and inter-number time (silent time) are within prescribed ranges. For example, if 12 musical numbers each continuing approximately 5 minutes are to be broadcast in a one-hour program, and if, specifically, the 11 musical numbers are just five minutes long and the one musical number is 6 minutes long, the sum total of the playing time exceeds the programming frame of one hour. If all of the numbers are just five minutes long, there is no silent time between the neighbouring musical numbers to lead to non-spontaneous broadcast. Thus, a lower limit value (e.g., 1.5 sec) and an upper limit value (e.g., 3 sec) of the silent time in case of broadcasting the materials are set, and it is then checked whether or not the silent time is comprised within this range. If the result is negative, a preset number is exchanged for a material having different playing time. Alternatively, shorter programming is used and a spare material for time control is inserted to pass the matching check.

Figure 4:
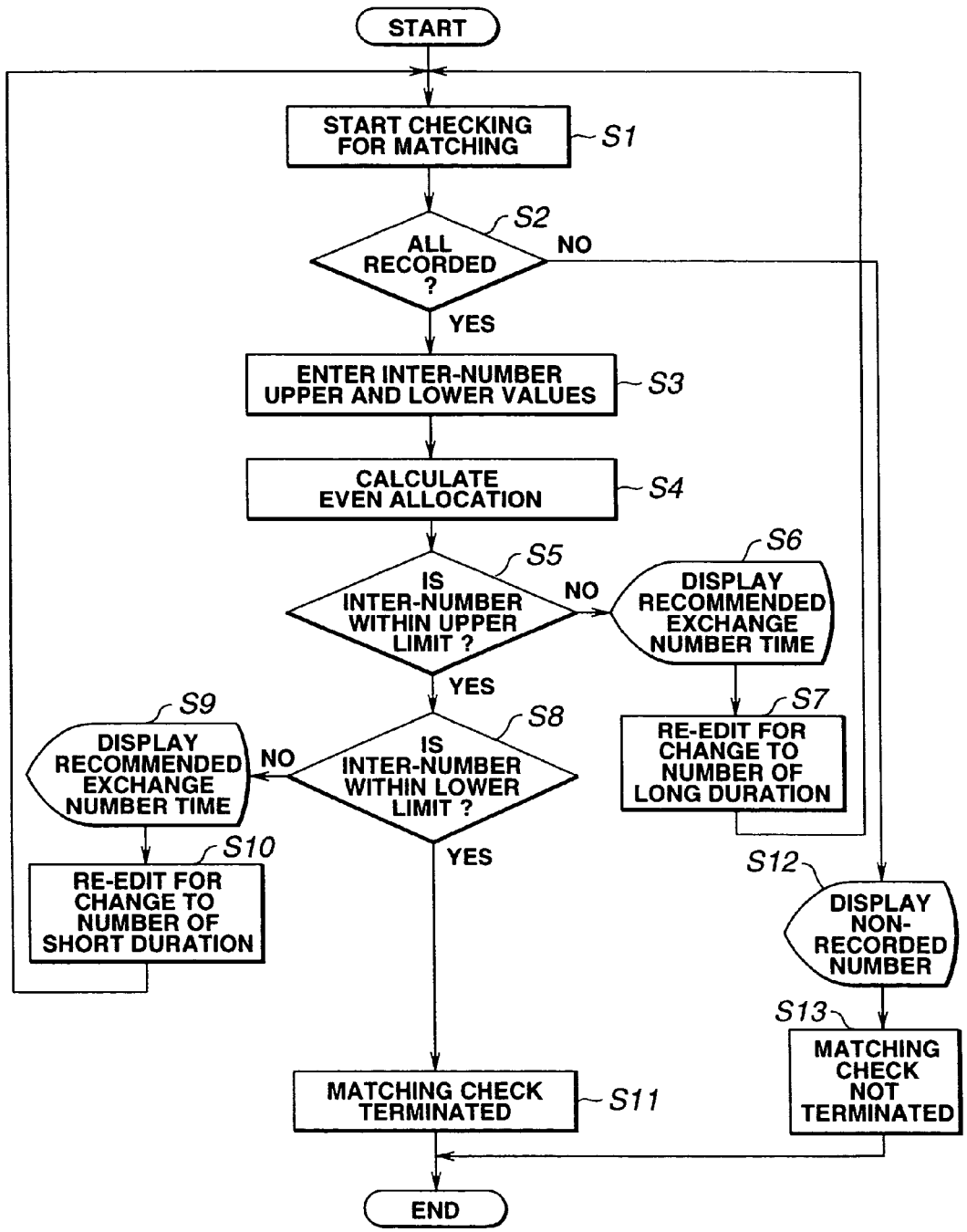
FIG. 4 is a flowchart for illustrating the processing of checking for matching.

FIG. 4 shows a flowchart for matching check processing. First, at step S1, matching check processing is started and, at step S2, it is checked whether or not all musical numbers have been recorded. If the result is affirmative, the materials to be checked for matching are definitively set. Thus, processing transfers to step S3 to enter the upper and lower values of the silent time. For example, the upper limit time of 3 sec and the lower limit time of 1.5 sec are entered.

Figure 5:
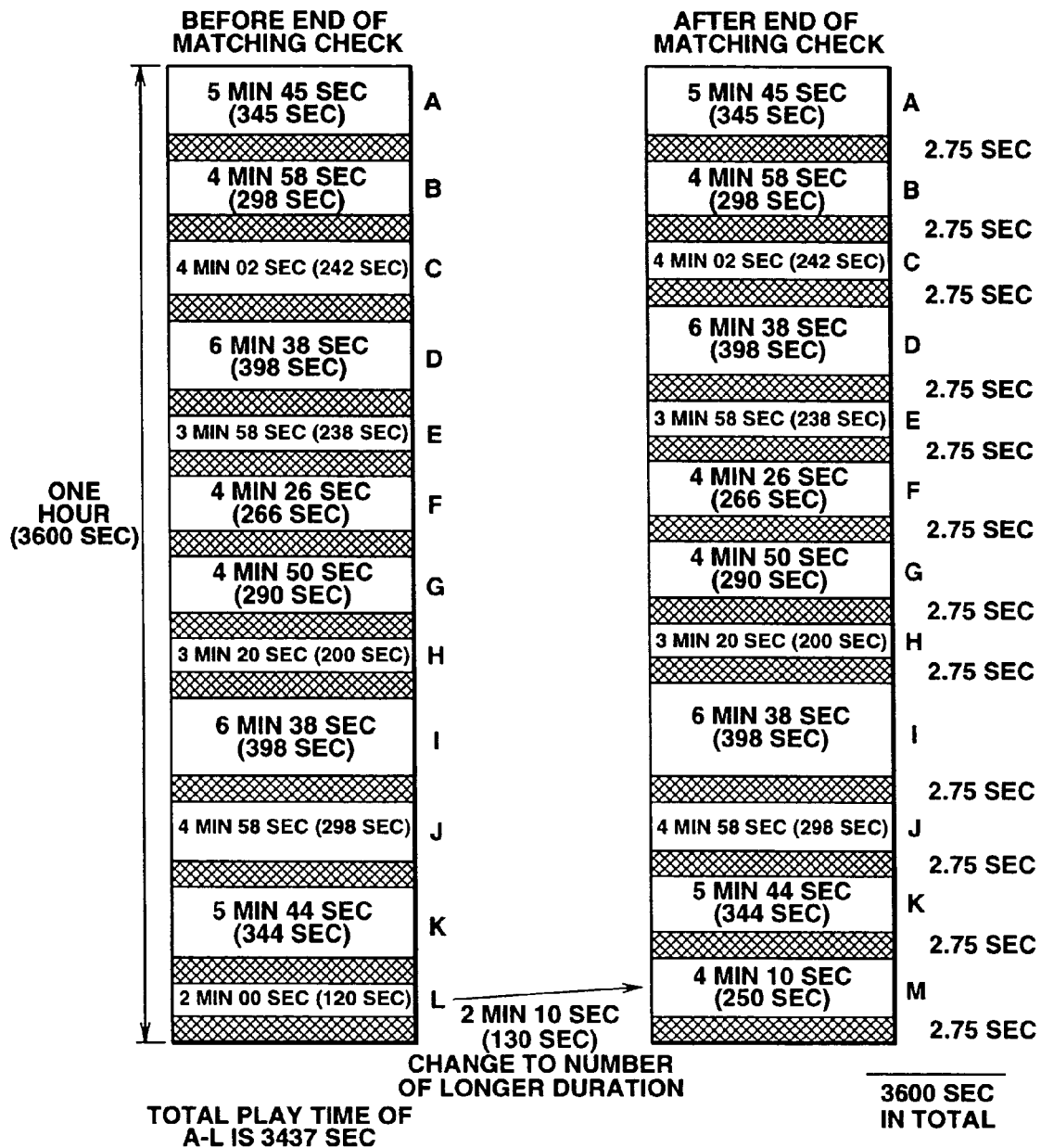
FIGS. 5A and 5B illustrate the processing of checking for matching.
Figure 6:
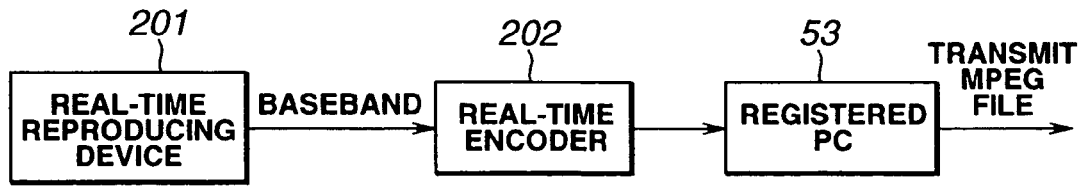
FIG. 6 is a block diagram showing an illustrative structure for filing musical numbers.
Figure 7:
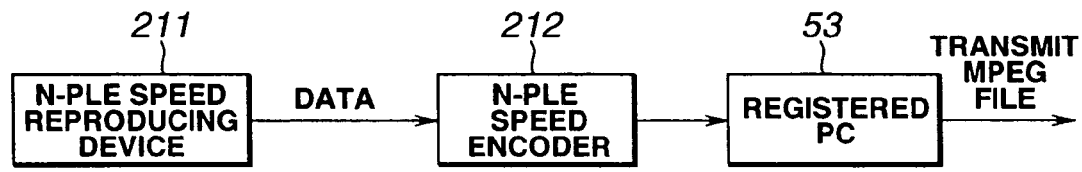
FIG. 7 is similarly a block diagram showing an illustrative structure for filing musical numbers.
Figure 8:
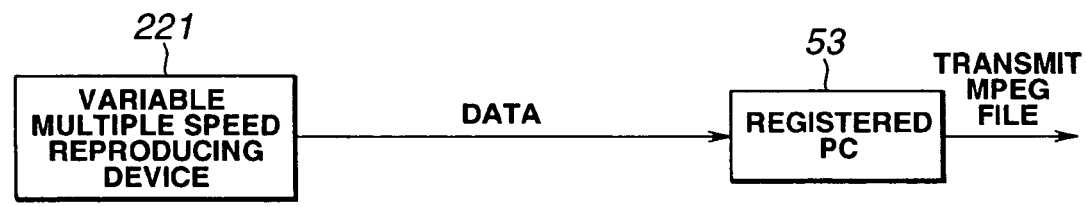
FIG. 8 is similarly a block diagram showing an illustrative structure for filing musical numbers.
Figure 9:
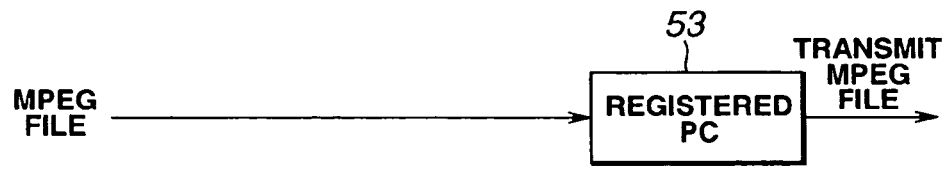
FIG. 9 is also a block diagram showing an illustrative structure for filing musical numbers.

Then, at step S4, calculations for even allocation are made. It is assumed that, as shown in FIG. 5A, the programming frame is one hour (3600 sec) and the musical numbers A to L are broadcast within this broadcast time. Since the total playing (reproducing) time of the numbers A to L is 3437 sec, the total silent time is 163 sec (=3600−3437) sec.

If this total silent time is divided by the number of silent inter-number periods (=12), an average silent time of 13.58 sec (=163 sec/12) is obtained.

Then, processing transfers to step S5 to check whether or not the silent time is less than the upper limit. In the present case, the silent time is 13.58 sec which is longer than the upper limit (3 sec). In this case, processing transfers to step S6 to display the recommended exchange number time.

In the present case, the sum total of the upper and lower silent time durations is 36 sec (=3 sec×12) and 18 sec (=1.5 sec×12). Therefore, the minimum additional play time is 127 sec (=total inter-number silent time of 136 sec−sum total of the upper limit of the inter-number silent time of 36 sec), with the maximum additional play time being 145 sec (=total inter-number time of 163 sec−sum total of the lower limit of the inter-number silent time of 18 sec). Thus, a message reading "it is necessary to change the current musical number to a musical number longer than it by 2 min 07 sec (127 sec) to 2 min 25 sec (145 sec)" is displayed on the programming PC 42.

The programmer at step S7 performs re-programming of exchanging the preset musical number to a musical number of longer duration.

Ii is assumed that a musical number L 2 minutes long is changed to a musical number M 4 min 10 sec (250 sec) long. Since the musical number m is longer than the musical number L by 2 min 10 sec (130 sec), the 2 musical numbers from A to K and the musical number M can be allocated with an even inter-number interval of 2.75 sec.

If, at step S5, the inter-number interval is longer than the upper limit value, processing transfers to step S8 to check whether or not the inter-number interval is within the lower limit value. If the inter-number spacing is within the lower limit value, processing transfers to step S11 ro complete matching check.

If it is found at step S8 that the inter-number time is not within the lower limit value, processing transfers to step S9 where the recommended exchange musical number playing time is displayed. At step S10, the programmer performs re-programming such as exchanging to a shorter musical number. To this end, a number of musical numbers of various durations are provided in advance and registered in a proprietary server 121 which will be explained subsequently.

If it is found at step S2 that not all of the musical numbers checked for matching are not in the recorded state, processing transfers to step S12 to display the non-recorded musical numbers on the programming PC 42. Since even allocation calculations in this case are not possible, processing transfers to step S13 to terminate the processing in the non-completed state of matching check.

Meanwhile, the play time of these materials is calculated on the basis of the time of the material information database on the programming server 41 (for the post-encoding material) instead of on the data base time of the CD inventory management server 21.

In this manner, a progress table for one day for one channel (file) is formulated. Ultimately, the programming supervisor acknowledges this progress table. The acknowledged progress table is locked against rewriting and transferred to an external hard disc 121A of the proprietary server 121 of the sending-out site 2 using the dedicated network 3.

4. In this manner, there is reserved in the programming server 41 a progress table as a database for each broadcasting day for each channel. In the programming server 41, there are stored, as the database, data on the materials stored as the broadcasting materials on the external hard disc 121A of the proprietary server 121 and data on the non-recorded materials scheduled to be broadcast in future and which are stored in the external hard disc 121A of the proprietary server 121. These data are basically composed of necessary item data for broadcast extracted from the data base of the CD inventory management server 21 and ancillary information on broadcasting, such as date of broadcast, broadcast channel and the name of the programmer.

The two programming servers 41-1 and 41-2 are provided with external hard discs 41A-1 and 41A-2 and are in dual operation. The 15 programming PCs 42-1 to 42-15 retrieve the programming server 41 and the CD inventory management server 21 to formulate a programming table. The maximum information storage volume of the programming server 41 is 100,000 materials.

The material information registration system 13 has eight CD players and eight amplifiers 15-1 to 15-8. Eight MPEG encoder/decoders 52-1 to 52-8 encode the playback outputs of the CD players and amplifiers 51-1 to 51-8 to output the encoded playback outputs to eight registration PCs 53-1 to 53-8. These registration PCs 53-1 to 53-8 output data sent from the encoder/decoders 52-1 to 52-8 via router 73-3, terminal adapter (TAs) 72-3 and a digital service unit (DSU) 71-3 over the dedicated network 3 to a DSU 125-3 of the sending-out site 2.

To the registration PCs 53-1 to 53-8 are connected eight live PCs 61-1 to 61-8. These live PCs 61 store data for live on its hard disc 61-A. Output data of the live PCs 61-1 to 61-8 are decoded by MPEG decoders 62-1 to 62-8 and thence supplied to codecs (encoder-decoders) 124-1 to 124-8 of the sending-out site 2 via codecs 63-1 to 63-8 over the dedicated network 3.

Meanwhile, outputs of the MPEG decoders 62-1 to 62-8 are summed to inputs of microphones 76-1 to 76-8 so as to be outputted at the codec 63.

To an archive control PC 54 is connected an archive MO changer 55 so that archiving data will be recorded on the MO disc driven by an archive MO changer 55. This archive control PC 54 is connected not only to the registration PC 53, live PC 61, inventory management server 21, programming server 41 and to the programming PC 42, but also to the proprietary server 121 over the dedicated network 3 via DSU 125-2, terminal adapter 126-2 and router 127-2.

The material information registration system 13 has the function of reproducing the musical numbers from storage mediums, such as CDs, by the CD player and the amplifier 51, to compress the reproduced musical numbers by the MPEG encoder/decoder 52 to prepare a material file and of transferring the file to the proprietary server 121 via the registration PC 53, router 73-3, terminal adapter 72-3, DSU 71-3, dedicated network 3, DSU 125-3, terminal adapter 126-3 and router 127-3. The material information registration system 13 also has the function of deleting the material in the proprietary server 121 and transferring the materials in the proprietary server 121 to the archive MO changer 55 via router 127-2, terminal adapter 126-2, DSU 125-2, dedicated network 3, DSU 71-2, terminal adapter 72-2, router 73-2 and archive control PC 54, and the function of arbitrarily selecting the musical number in the proprietary server 121 to reproduce the music via router 127-3, terminal adapter 126-3, DSU 125-3, dedicated network 3, DSU 71-3, terminal adapter 72-3, router 73-3, registration PC 53, MPEG encoder/decoder 52, CD player and amplifier 51.

If, as a result of retrieval on the material information management progress editing system 12 for musical numbers which a programmer desires to broadcast, the targeted material has not been found and, as a result of retrieval on the CD inventory management server 21, the targeted material has been found, that musical number is dragged into a programming frame on the GUI of the programming PC 42. Since this material has not been encoded as yet on the list of the material information, this musical number is "unrecorded" as far as the programming frame is concerned. The unrecorded musical number is notified via dedicated network 3 to this material information registration system 13.

The operator in charge of registration of the material information appoints one of the unrecorded musical numbers, i.e., candidate musical numbers for registration, that is now to be registered, in order to avoid overlapping with similar operations by other operators. After appointment, the operator in charge of registration of the material information goes to a reception point of the information source management system 11 to have a required CD medium leased out. Since the material information drawn out on the programming PC 42 is derived from the database of the CD inventory management server 21, the targeted CD medium can be acquired instantly by having reference to the CD medium management number.

In a booth for material registration, a musical number as a candidate for material registration and a musical number contained in the leased-out CD medium are electronically collated to each other for verification. This can be realized by checking to see if a value which is uniquely determined for a musical number by a predetermined calculating formula based on the performance time and a track number for a musical number etc on the occasion of CD inventory registration and which is stored as a collation ID in the database coincides with a value as found on re-calculation on the occasion of leasing.

The musical number thus identified is set on a CD player and the amplifier 51 and real-time encoded on the MPEG encoder/decoder 52 for storage as an MPEG file on the hard disc 53A of the PC 53. The material (file) which has been written is transferred over the dedicated network 3 to the external hard disc 121A of the proprietary server 121 of the sending-out site 2. The file (material) stored on the external hard disc 121A of the proprietary server 121 of the sending-out site 2 is transferred over the dedicated network 3 to the hard disc 53A of the registration PC 53 of the programming site 1. The operator in charge of the material information registration reproduces the file (material) transferred from the proprietary server 121 by the MPEG encoder/decoder 52 to listen tentatively to the reproduced sound from its beginning end to the last. The material which is found to be unobjectionable on tentative hearing is finally "recorded".

A musical number can be prepared into a MPEG file by a method shown in FIGS. 6 to 9.

1. In the method shown in FIG. 6, the music (baseband) is reproduced by a real-time reproducing device 201 (for example, a CD player) and an amplifier 51 and compressed by a real-time encoder 202 as the MPEG encoder/decoder 52 and stored on the hard disc 53A of the registration PC 53.
2. In the method shown in FIG. 7, data is read by the CD player and an eight-tuple speed encoder 212 (N being a number larger than 1 and including a decimal number) as the MPEG encoder/decoder 52 for storage on the hard disc 53A of the registration PC 53.

3. In the method shown in FIG. 8, data is read into a variable multiple speed reproducing device 221 (such as CD-ROM player) including a CD player and an amplifier 51 so as to be then temporarily stored directly in the internal memory or the hard disc 53A of the registration PC 53. The stored data is encoded on a software and stored in the hard disc 53A. The variable multiple speed herein encompasses burst readout control.

4. In the method shown in FIG. 9, an externally encoded file is furnished and stored in the hard disc 53A of the registration PC 53.

In the material information registration system 13, the file (material) transferred from the proprietary server 121 via router 127-2, terminal adapter 126-2, DSU 125-2, dedicated network 3, DSU 71-2, terminal adapter 72-2, router 73-2 and the live PC 61 is decoded and reproduced by the MPEG encoder/decoder 62 for sending out the live broadcast by a disc jockey (DJ). The programming server 41 is retrieved from the live PC 61 as a DJ terminal in search of a musical number desired to be broadcast to check whether or not he targeted musical number has already been recorded. This material is transferred from the proprietary server 121 of the sending-out site 2 via the dedicated network 3 to reproduce (decode) the musical number by the decoder 62. The speech signal collected by the microphone 76 is A/D converted and mixed on an output of the MPEG encoder/decoder 62.

Since the capacity of the external hard disc 121A of the expensive high-speed proprietary server 121 is finite, it is saturated sooner or later. Thus, the capacity of the external hard disc 121A of the proprietary server 121 is perpetually monitored and the material of the material as a candidate for deletion is displayed on the archive control PC 54 in accordance with pre-set conditions. This condition includes the material being previously broadcast not more than twice in one year and the musical number being specified as a candidate for deletion after the end of the broadcasting. Conversely, the material specified to be not listed as a candidate for deletion at the time of material registration is excluded from the list of the candidates for deletion. The corresponding processing is automatically carried out by the material supervisor specifying the musical number actually deleted from the candidates for deletion, musical numbers archived on the MO disc and the musical numbers not listed as the candidate for deletion.

If found to be necessary for programming, the musical numbers archived on the MO disc of the archive MO changer 55 can be returned by batch processing to the external hard disc 121A of the proprietary server 121. To this end, the proprietary server 121 and the archive control PC 54 are interconnected via the router 127-2, terminal adapter 126-2, DSU 125-2, dedicated network 3, DSU 71-2, terminal adapter 72-2 and router 73-2.

Figure 10:
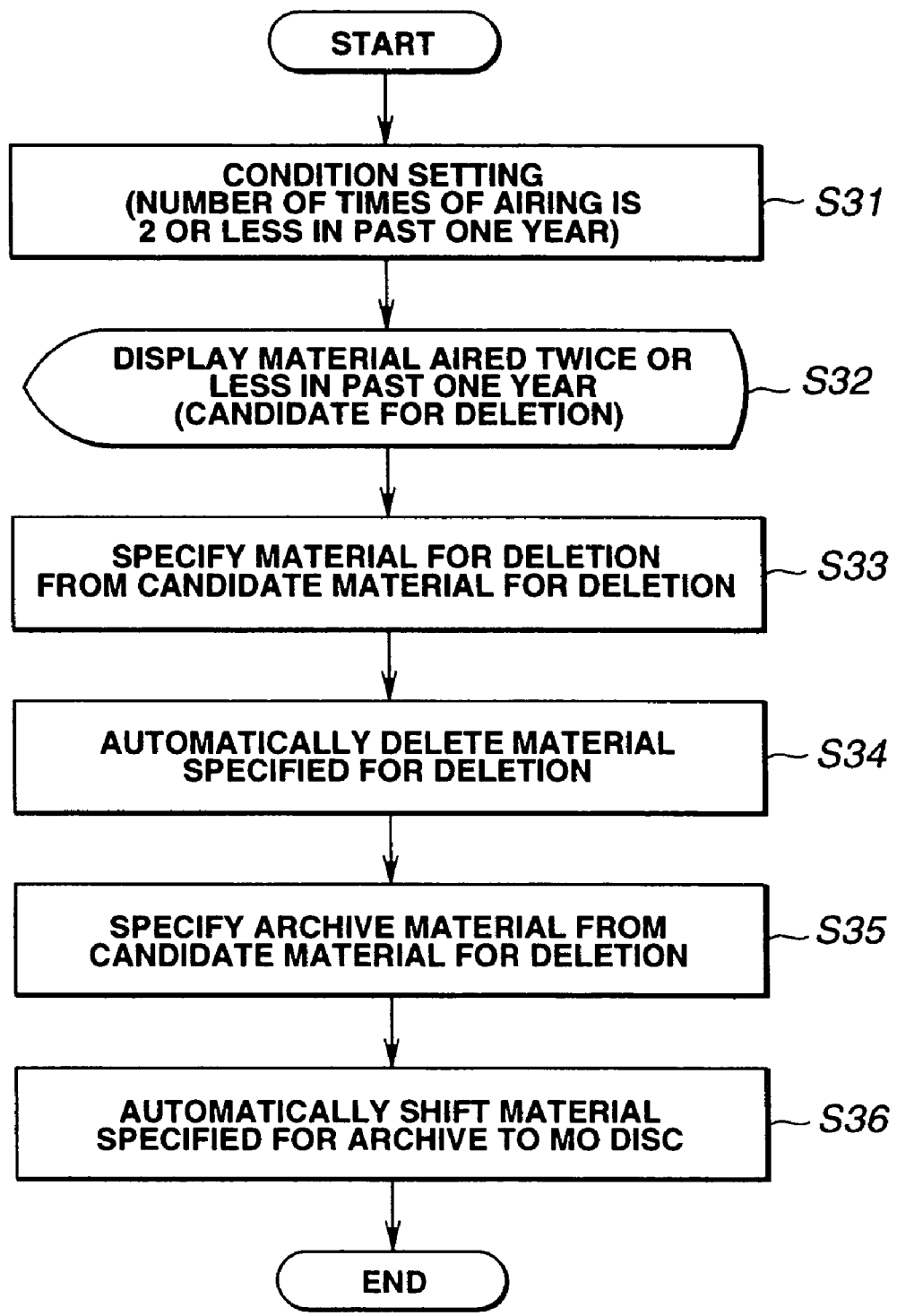
FIG. 10 is a flowchart for illustrating the filing of musical numbers.

FIG. 10 shows details of this archiving processing. That is, at step S31, an archiving condition is set from the archive control PC 54 or the registration PC 53. This condition may include the musical numbers being broadcast twice or less in the past one year, as discussed above. The archive control PC 54 then proceeds to step S32 to retrieve the programming server 41 in search of materials broadcast twice or less in the past one year. The musical numbers thus found out on retrieval are displayed as a candidate for deletion on the archive control PC 54 or on the registration PC 53.

Then, processing transfers to step S33 to specify the materials listed as candidates for deletion displayed at step S32 and which are actually deleted by the material supervisor. If this designation is made, the archive control PC 54 deletes at step S34 the specified material from the list of registration of the proprietary server 121.

At step S35, the material supervisor designates the archive material from the materials listed as candidates for deletion. If this designation is made, the archive control PC 54 at step S36 archives the material, registered in the proprietary server 121, on the MO disc of the archive MO changer 55.

This enables the materials to be stored separately in the hard disc 121A which is high in speed but low in capacity and in the MO disc lower in speed but larger in capacity than the hard disc 121A. This achieves a smaller size and a lower cost than in the case of storing the materials in their entirety on the hard disc 121A.

That is, candidates for material registration on a database of the programming server 41 are comprehended by eight registration PCs 53-1 to 53-8 and the materials are filed by eight encoder/decoders 52-1 to 52-8 connected to the respective registration PCs 53. The candidate materials for deletion on the sole database of the programming server 41 are known by the sole archive control PC 54 (client) and deleted from the registration PC 5, or a MO disc of the sole archive MO changer 55 connected in circuit is archived. The recorded materials on the database of the programming server 41 are comprehended by the eight live PCs 61-1 to 61-8 (clients) and musical numbers are reproduced by the eight decoders 62-1 to 62-8 connected to the live PCs 61-1 to 61-8.

If a material, once archived, is to be used again on the progress table, such material needs to be again held on the proprietary server 121. That is, if a material is specified on the progress table, it is checked whether or not the material has been recorded. The material, which has not been recorded, needs to be recorded. However, an archived material is a pre-recorded material. The programming server 41 manages the information on the materials on the database formed on the hard disc 41A. If the material is an archived material, the programming server 41 also holds the recording position of the archive MO changer 55 of the material.

If the material specified on the progress table has been found to be an archived material, the programming server 41 controls the archive control PC 54 by batch processing when a preset time point is reached to allow the material held by the archive MO changer 55 to be read out and transferred to the proprietary server 121 so as to be held therein.

Of course, the programmer can perform a manual operation as the occasion may demand to transfer the archived material to the proprietary server 121 so as to be held therein.

It is also possible to make selection by batch precessing as to whether or not the function of automatically transferring archived materials specified on the progress table to the proprietary server 121 for holding therein is to be halted or continued. This avoids erroneous restoration of the archived material by the proprietary server 121.

The proprietary server and the multi-channel sending-out system 101 has two proprietary servers 121-1, 121-2. To these proprietary server is connected a hard disc (disc array) 121A having the capacity of, for example, 500 GB. The proprietary server 121 is connected to the programming server 41 via router 127-1, terminal adapter 126-1, DSU 125-1, dedicated network 3, DSU 71-1 of the programming site 1, terminal adapter 72-1 and router 73-1.

To the proprietary server 121 are connected nine sending-out servers 123-1 to 123-9 via a hub (HUB) 122 on the dedicated network 3. To the sending-out servers 123-1 to 123-9 are respectively connected hard discs 123A-1 to 123A-9, each having a capacity of 20 GB.

The sending-out servers 123-1 to 123-9 are fed with outputs of the MPEG encoders 129-1 to 129-9, respectively. The MPEG encoders 129-1 to 129-9 are configured to encode and output data sent from codecs 63-1 to 63-8 of the programming site 1 over dedicated network 3 to codecs 124-1 to 124-8 and thence supplied to the MPEG encoders.

Of the sending-out servers 123-1 to 123-9 and the MPEG encoders 129-1 to 129-9, a sole sending-out server 123 and a sole MPEG encoder 129 are spare stand-by components used in place of other occasionally malfunctioning sending-out server 123 or MPEG encoder 129.

In the proprietary server and multi-channel sending-out system 101, the proprietary server 121 owns, in its external hard disc 121A, the material comprised of MPEG-compressed (encoded) musical numbers required for broadcast, progress tables and the entire system configuration required for sending out multi-channel data, herein 100-channel data (the information required for controlling the entire system).

The sending-out server 123 executes format conversion and multiplexing for 13 channels at the maximum by software.

The capacity of the external hard disc 121A of the proprietary server 121 of the present embodiment is 500 Gbyte. If each musical number has a duration of five minutes and the material has a rate of 256 kbit/sec, the storage capacity of the hard disc is approximately 50,000 musical numbers, under the following conditions:

sampling frequency: 48 kHz
number of quantization bits: 16 bits
speech mode: stereo
compression ratio: 1/6 (256 kbps)
performance time: five minutes.

The above storage capacity can be calculated as follows:

$$48\,\text{kHz} \times 16\,\text{bits} \times 2 \times (1/6) \times 60 \times 5 \times (1/8) = \text{approximately 10 Mbyte}$$

approximately 500 Gbyte/approximately 10 Mbyte=50,000 musical numbers.

The file size for the progress table and the entire configuration required for sending out 100 channels is extremely small as compared to the capacity of the material.

The accessing to the proprietary server 121 from the programming site 1 can be had in the following manner:
1. Transfer of the progress table for each channel and for each broadcasting day from the material information management progress editing system 12;
2. transfer (registration) of the material from the material information registration system 13;
3. transfer of the material to the material information registration system 13 (tentative hearing and reproduction of musical numbers);
4. deletion of the material in the proprietary server 121 from the material information registration system 13;
5. transfer and deletion of the material for the material information registration system 13 to the archive MO changer 55; and
6. restoration of the material from the archive MO changer 55 of the material information registration system 13.

The system configuration file stored in the proprietary server 121 is as follows:

Common time: The sending-out system in its entirety co-owns correct time.

Bitrate Table: Defines the bitrate of the music channel to be sent out.

Channel Combination Table: Defines channels to be handled by the sending-out server 123.

Current MUX Using State: Indicates the current operating system of the second-order multiple satellite sending-out system 102.

PMT (Program map Table): Program map table.

Service Accommodating Table: Table showing the correspondence between the management channel number and the broadcasting service number.

The sending-out system herein denotes the programming server 41, proprietary server 121, sending-out server 123, a switching control PC 182 and a multiplexer controller MXC 144. Of these, the proprietary server 121 can store the common information of the sending-out system which can be referred to and updated at any time during the system operation.

Figures 11, 12:
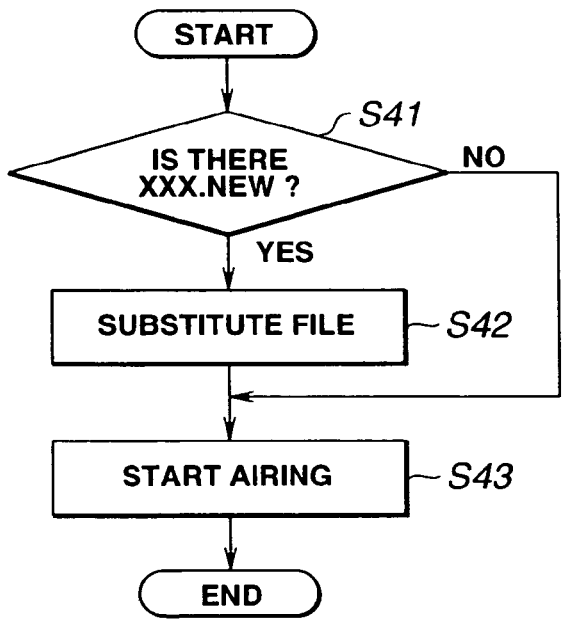
FIG. 11 illustrates a configuration.
FIG. 12 is a flowchart for illustrating the updating of a configuration file.

FIG. 11 shows the relation between the setting server and the referring server for these configurations.

The bitrate table, PTM and the service accommodation table define the basic system parameters and are not modified during normal operation. Although the channel combination table or the current MUX using state are not changed during the normal operation, the sending-out server 123 responsible for the channel group is modified on the occasion of malfunctions or maintenance.

In the leading connotation lines of the files of these configurations are recorded updating dates from which the referring side can know the possible occurrence of past updating.

The "management channel number" in the following explanation is the number corresponding to the internal channel of the system and is a serial number of from 1 to 100.

<Common Time>

The switching control PC 182 periodically sets and calibrates the common time of the proprietary server 121, with the time measured by an in-station timepiece 184 as a reference. The sending-out server 123 and the MXC 144 execute the update command for the proprietary server 121 to set the time of the entire sending-out system.

<Bitrate>

The bitrate table gives definition on the sending-out bitrate for each channel, whether the sending-out is that from the material file held in the proprietary server 121 or the real-time sending-out from the real-time MPEG encoder 129 and the genre of the music aired as connotation. To this table, set by the switching control PC 182, reference is had by the programming server 41 and the sending-out server 123.

<Channel Combination Table>

This channel combination table is a file which gives definition of a management channel taken charge of by the sole sending-out server 123. This is set by a switching control PC 182 with the file transfer protocol (ftp) and reference is had thereto by the sending-out server 123 and by the MXC 144.

<Current MUX Using State>

This is the current operating system of a multiplexer (MUX) 141 of the second-order multiple satellite sending out system 102 of a duplex configuration. The MXC 144 refers to this which is set by the switching control PC 182.

<PMT (Program Map Table)>

The PMT is a file defining the map information allocated to each broadcast channel. The sending-out server 123 refers to this table which is updated every day by the MXC 144 with ftp.

The PMT transfer sequence is as follows:
time point t1 [MXC144→proprietary server 121].
The PMT for the next day is transferred by ftp as PMT.new;
time point t2 [proprietary server 121].

If there is PMT.new, its file name is changed to PMT;
time point t3 [sending-out server 123]broadcasting for the day is terminated;
time point t4 [proprietary server 121→sending-out server 123] PMT copying.
time point t5 [sending-out server 123]broadcasting for the next day is started.

The broadcasting time of from time point t0 to time point t6 is one day (one cycle), with the above sequence of operations for time point t1 to timer point t5 being preset time in the course of one cycle.

The proprietary server 121 checks the possible presence of new PMTs (PMT.new) at a pre-set time point every day to receive the new PMT, if any, by setting its file name to PMT. The sending-out server 123 copies the PMT prior to start of daily broadcast. If the proprietary server 121 is malfunctioning, the PMT copied on the previous day is sent out.

<Service Accommodation Table>

This table, representing the correspondence of the management channel number to the 'channel number' allocated on the broadcast service, is set by the switching control PC 182. Reference to this table is had by the sending-out server 123 and the MXC 144.

<Configuration File Changing Method>

If the files of the bitrate table, channel combination table and the service accommodation table are updated, suffixes (.new) are attached to the filenames:

bitrate table: /100ch/config./bitrate.new
channel combination table: /100ch/config/Channel.new
service accommodation table: /100ch/config/service.new and the resulting filenames are sent to the proprietary server 121 with ftp.

The proprietary server 121 checks the possible presence of these updated files at a preset time point near the broadcast end time. If there is any, the proprietary server 121 receives it on changing the filename of the updated file to a filename freed of the suffixes.

Prior to start of broadcast of every day, the sending-out server 123 copies the received file (file freed of the suffix). If the proprietary server 121 is malfunctioning at this time, the file copied on the previous day is used as being valid.

FIG. 12 shows the processing of changing the configuration file (updating) in a flowchart, in which, at step S41, the proprietary server 121 checks whether or not there is any file having the suffix (.new). If such file exists, the proprietary server 121 proceeds to step S42 and, if otherwise, it executes file substitution processing.

That is, the proprietary server 121 updates the file of the filename devoid of the suffix (.new) with the contents of the file having the suffix. If, for example, there is a file ABC.new, the file ABC is updated by the file ABC.new. The filename of the as-updated file is ABC.

After execution of this processing file substitution, processing transfers to step S43. If it is verified at step S41 that there is no file having the suffix (.new), processing skips step S42 to transfer to step S43. At step S43, the file thus updated at the proprietary server 121 is copied by the sending-out server 123 which then broadcasts the contents.

In the present embodiment, nine sending-out servers 123 are used, of which eight are actually used and the remaining one is a spare. The sole sending-out server 123 receives, as an input, the material files of plural channels (up to a maximum of 13 channels in the present embodiment) from the proprietary server 121 and a material stream from the real-time encoder 129 for MPEG compression (encoding) in real-time, and real-time converts and multiplexes the received material files, by software, into a transport stream (TS) of the MPEG system standard.

The sending-out server 123 also simultaneously multiplexes the program map table (PMT) and the program clock reference (PCR) by way of a first-order multiplexing.

If 100 channels in sum are broadcast, as in the present embodiment, six, one and the remaining one of eight sending-out servers 123 performs first-order multiplication of 13, 12 and 10 channels, respectively. The multiplexed signals are converted into electrical signals which are outputted in parallel to two multiplexers 141-1 (for use actually) and 141-2 (spare) of the second-order multiple satellite sending out system 102. The same electrical signals are outputted in parallel to a TS speech monitor 163. The electrical signals flowing in the cable of the transmission channel are signals sent from the sending-out server 123 to the multiplexer 141 and to the TS speech monitor 163, with the contents being TS data, clocks, syncs and data valid.

At date changing time (4.00), the sending-out server 123 sequentially reads out the files of the material necessary for broadcast, from the external hard disc 123A of the sending-out server 123, in accordance with the progress table of the plural channels in its charge for the day acquired on the previous day. Simultaneously, the material stream, MPEG compressed in real time by the MPEG encoder 129, is converted into a parallel transport stream packet of the MPEG system standard. Also, the PMT packets are formulated and a null packet is inserted, after which PCR packets are multiplexed and the time information is impressed thereon to output the resulting packets.

The sending-out server 123 reads out from the proprietary server 121 the progress table for the channels in its charge for the next day to copy the material necessary for the next day broadcast from the proprietary server 121 to the external hard disc 123A of the sending-out server 123 in accordance with the progress table. Thus, if the proprietary server 121 is malfunctioning or the delivery of the progress table is delayed, accommodation can be postponed to the next day. If the proprietary server 121 is malfunctioning or the progress table is delayed for two or more days, the progress table for the previous day may be used by copying for the day to avoid the accident of total failure in broadcast.

The capacity of the external hard disc 123A of the sending-out server 123 in the present embodiment is assumed to be two days. The disc capacity is decreased if the broadcast material is overlapped, such as for the current day and for the next day, than if the materials not overlapping in each channel or in the totality of channels are broadcast. In an extreme case, if the same material is aired for two days on end in the totality of the channels, the disc capacity equal to a sole material file suffices. Depending on the particular operation, a specified channel may be of short duration, while another specified channel may be of a longer duration.

If one of the eight sending-out servers 123 is malfunctioning and cannot broadcast, the broadcast of the totality of channels supervised by the associated sending-out server 123-$i$ is halted. The process executed by the malfunctioning sending-out server 123-$i$ is switched to the spare sending-out server 128$j$ (9/8 redundant switching). A switching control PC 182, as later explained, rewrites the configuration of the proprietary server 121 and subsequently advises each sending-out server 123 and the MXC 144 of the fact that the configuration has been rewritten. The spare sending-out server 128-$j$, in the stand-by state, acquires from the proprietary server 121 the progress table supervised by the malfunctioning sending-out server 128-$i$, and reads out the material currently needed for sending in accordance with the progress table from the proprietary server 121 to start the send-out. Simultaneously, the MXC 144 switches the input channels of the MUX 141. Specifically, the input gate of the malfunctioning MUX 141 is closed and another spare input gate, so far closed, is opened. This immediately starts, that is restores, the broadcast.

The sending-out server 123-*j* reprieves the material file required for the current day and the next day from the progress table of the channels in its charge to read it out from the proprietary server 121 to sequentially copy the read-out material file in the external hard disc 123A-*i*. That is, since the transfer of the material file to be sent out occurs more speedily than the readout thereof, the file to be sent out is sent out without waiting for completion of copying of all materials and copying is competed in the interim. This leads to the same setting of the spare sending-out server 123-*j* as that of the malfunctioning sending-out server 123-*i*. If malfunctioning leads to exchange, the malfunctioning sending-out server 123-*i* may be kept at a standstill as a spare and repaired without the necessity of reverting the spare server as a server in use.

Figure 13:
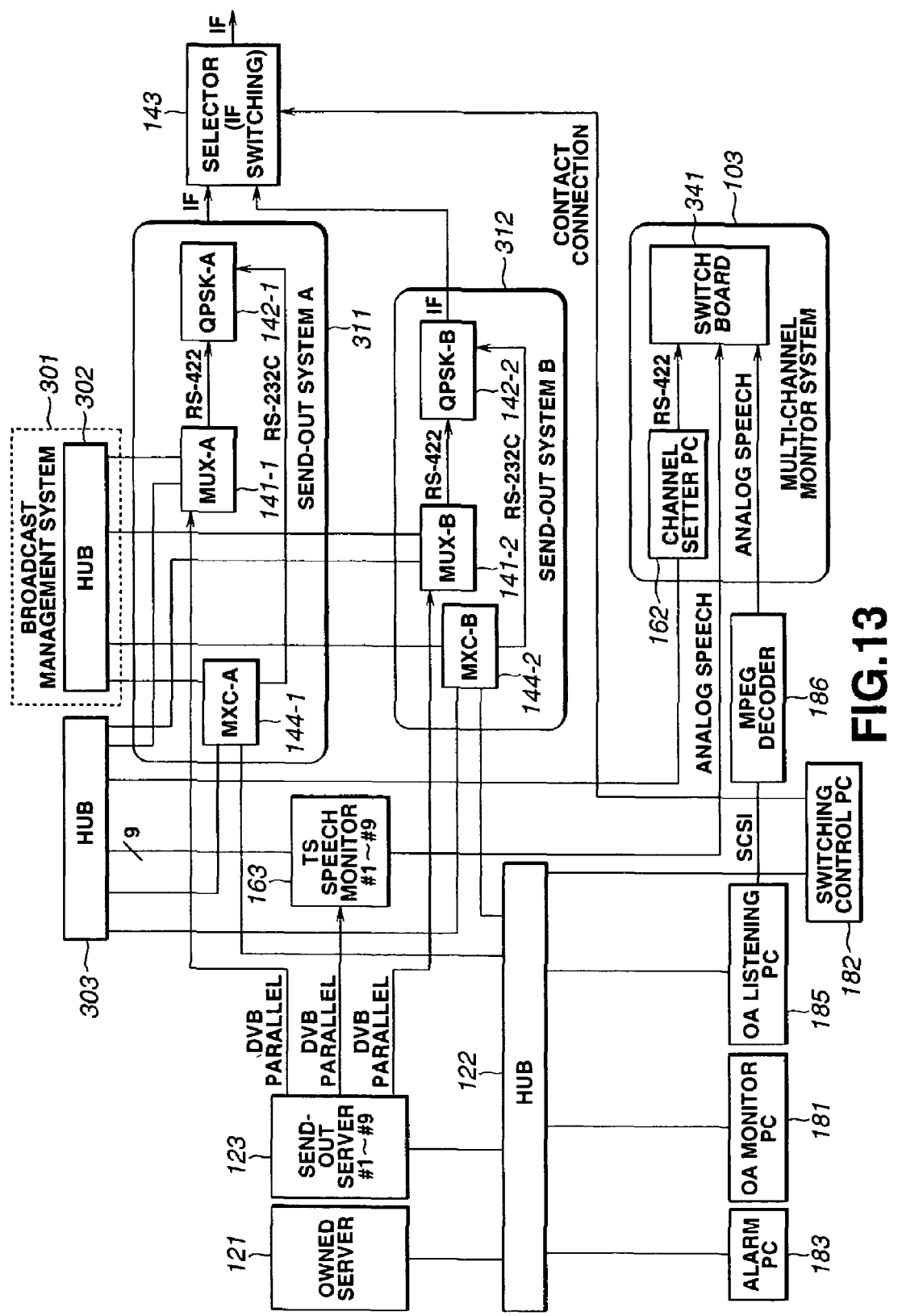
FIG. 13 illustrates the relation of interconnection for a multiplexing controller.

The second-order multiple satellite sending out system 102 has a sending-out system A type 311 and a sending-out system B type 312, as shown in FIG. 13. The multiplexer 141-1 constituting the sending-out system A type 311 is fed with outputs of the sending-out servers 123-1 to 123-9. The multiplexer 141-1 selects an output of the preset eight sending-out servers 123, under control by the MXC 144-1, to send the output to the modulator 142-1. The modulator 142-1 modulates the input data in accordance with the QPSK system to output the modulated signal to a selector 143.

Similarly, the multiplexer 141-2 of the sending-out system B type 312 selects an output of the sending-out server 123, under control by a MXC 144-2, to send the selected output to the modulator 142-2. The modulator 142-2 modulates the input signal in accordance with the QPSK system to issue the modulated signal to the selector 143.

The sending-out server 123 transfers data by digital video broadcasting DVB parallel or LVDS to the MXC 144 and to the TS speech monitor 163.

The selector 143 selects one of the signals entered by the modulator 142-1 or the modulator 142-2, under control by the switching control PC 182, to output the selected signal to a satellite via an intermediate frequency (IF) processing circuit, not shown.

The multiplexer 141 and the MXC 144 are fed with predetermined signals from a broadcast management system 301 supervising the broadcast in its entirety.

The second-order multiple satellite sending out system 102 sends to the multiplexer 141*a* first-order multiplexed TS multiplexed from 13-channel program elementary stream (PES) packets, PMT packets and PCR packets furnished from eight channels of the sending-out servers 123. The multiplexer 141, as a second-order multiplexer 141, multiplexes these packets with all packets to be sent out to a satellite, such as packets required for selection of programs other than PMTs, program guide packets, program management packets or customer management packets, and outputs the resulting multiplexed packets. The output is outputted as modulated signals after appendage of error correction codes by a QPSK modulator 142 and subsequent QPSK modulation.

The MUX 144 receives working data (prescribing the working of the entire broadcast) for the next day from the broadcast management system 301 at 26.30 every day and formulates a PMT file at 27.50 to transfer the file at PMT.new via hub 122 to the proprietary server 121. The MXC 144 also transfers to the multiplexer 141 the schedule and the setting for the sending-out of all packets sent out to the satellite, such as packets required for program selection other than PMT, packets for program guide, program management packets or customer management packets.

Figure 14:
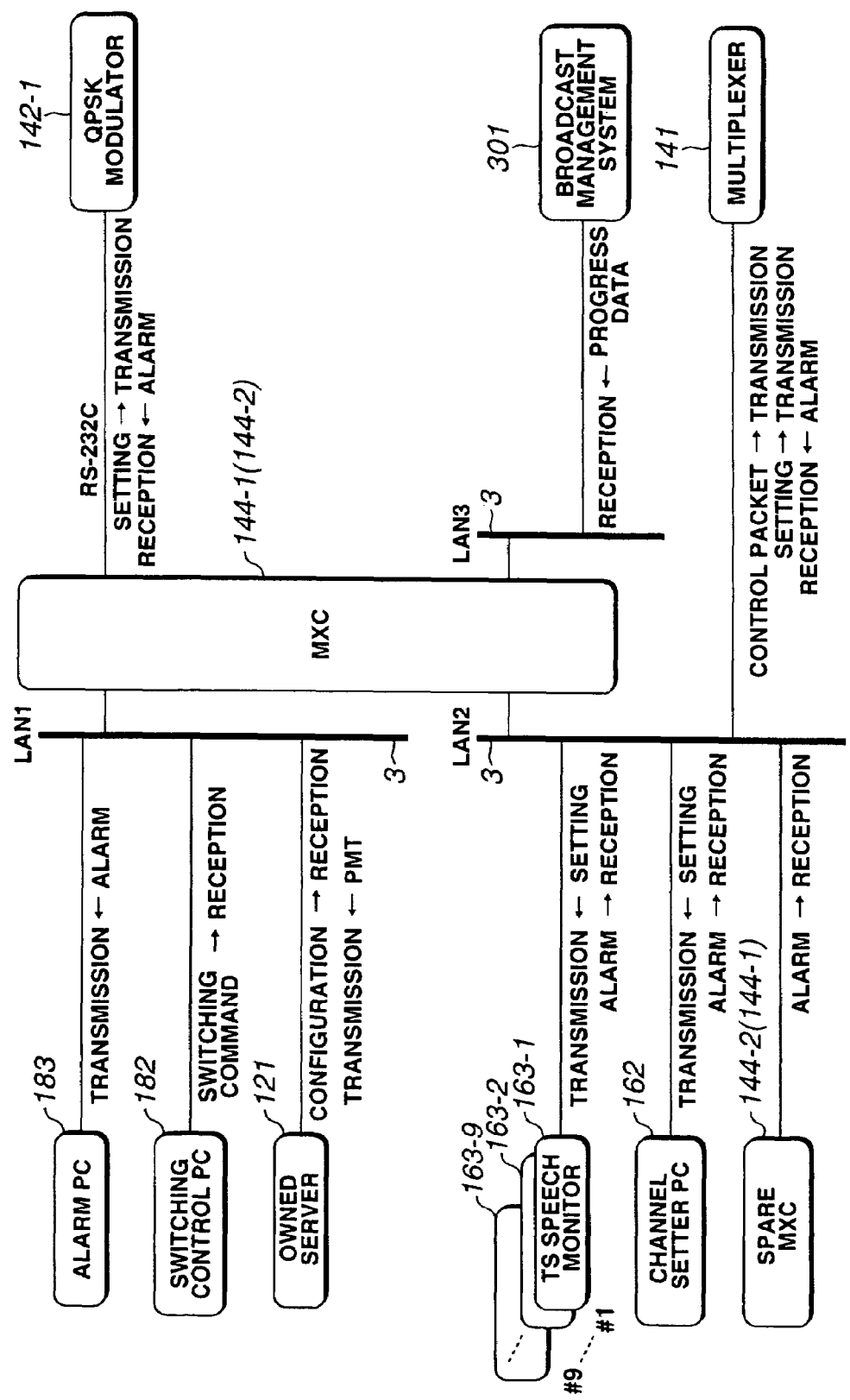
FIG. 14 illustrates signal exchange for the multiplexing controller.

FIG. 14 shows the structure of a peripheral device looking from the current MIC 144. In FIG. 14, transmission or reception means that as viewed from the current MXC 144-1 (or 144-2) arranged at the center.

The MXC 144 is made up of MXC144-1 (MXC-A) and MXC 144-2 (MXC-B) which independently control the A-channel and B-channel downstream of MXC 144. Only the current operating system MXC 144 sends the control information via hub 122 to the sending-out server 123, while sending the information via hub 303 to a TS speech monitor 163 and controlling the information via hub 303 and a channel setter PC 162 to a switchboard 341 of a multi-channel monitor 161 of the multi-channel monitoring system 103 (FIG. 13). It is up to the configuration on the proprietary server 121 that is responsible for discrimination between the current MXC or spare MXC.

One of the principal roles of the MXC 144 is to set various parameters. It sets initial parameters and subsequently is not responsible for sending-out or working, unless an abnormal state occurs. Another role of the MXC is checking the abnormality. It monitors each peripheral device and advises an alarm PC 183 of an alarm and, subject to switching instructions from the switching control PC 182, performs switching control in accordance with the configuration on the proprietary server 121 (FIG. 14).

The MXC 144-1 and MXC 144-2 request writing of dummy data every five minutes, as an example, and confirms its execution to monitor the operation of each other. If an abnormality in the current MXC is notified to the alarm PC 183 by a spare MXC, the monitoring operator verifies this to control the switching control PC 182 to interchange the operating and spare MXCs.

The roles of the operating MXC 144 are as follows:
reception of various sending-out control information from the broadcast management system 301;
transmission of PMT files to the proprietary server 121;
reception of the configuration for time, operating/spare designation etc from the proprietary server 121;
notification of alarm to the alarm PC 183;
reception of command for switching from the witching control PC 182;
setting and monitoring of current operating system MUX 141;
    switching of the input channel of the current operating system MUX 141 during abnormality of the sending-out server 123 and transmission of errors of an input channel of the current operating system MUX 141;
    transmission of an error of an input channel of the current operating system MUX 141;
setting and monitoring of the QPSK modulator 142 of the current operating system;
monitoring of the spare system MXC 144;
setting and monitoring of the TS speech monitor 163;
setting and monitoring of the channel setter PC 162;
The roles of the spare system MXC 144 are as follows:
reception of various sending-out control information items from the broadcast management system 301;
reception of the configuration of the time, current operating/spare designation from the proprietary server 121;
notification of abnormality to the alarm PC 183;
reception of switching commands from the switching control PC 182;

setting and monitoring of the spare system MUX 141;
transmission of errors of an input channel of the spare system MUX 141 of the input channel at the time of abnormality in the sending-out server 123; setting and monitoring of the synchronization signal detection unit 142; and monitoring of the current operating system MXC 144.

There are A-route and B-route devices for each of the multiplexer 141, a QPSK modulator 142 and a MXC 144, these A- and B-route devices operating completely independently of each other. Outputs of the respective QPSK modulators 142 are sent to the selector 143, with the switching being taken charge of by the switching control PC 182. This switches between the current operating and spare system devices (A/B switching). The MXC 144 transfers the setting and the schedule independently to the respective MXCs 141. However, it is only the MXC 144 of the current operating system that is responsible for transmission of the PMT file to the proprietary server 121, setting and monitoring of the TS speech monitor 163 and setting and monitoring of the channel setter PC 162.

The multi-channel monitoring system 103 includes a multi-channel monitor 161. This multi-channel monitor 161 is fed with outputs of the modulators 142-1 and 142-2 and an output of the TS speech monitor 163. This multi-channel monitor 161 is also fed with a reception IF signal obtained on receiving and demodulating electrical waves from a satellite received by a receiver, not shown. The multi-channel monitor 161 is also fed with an output of an OA listening PC 165 after decoding by a MPEG decoder 166. The multi-channel monitor 161 can suitably monitor these inputs, while the channel setter PC 162 can control the multi-channel monitor 161.

The multi-channel monitoring system 103 is a system monitoring whether or not all channels are being sent out correctly. The multi-channel monitoring system 103 first receives the transmission electrical waves from the satellite and distributes the electrical waves among 100 integrated receiver-decoders (IRDs) as receivers. These IRDs reproduce the sound and displays the reproduced sound in unison in 100-channel peak level meters of the multi-channel monitor 161. The monitoring operator can comprehend the send-out state at a glance based on movements of a movable part of the meter. The multi-channel monitor 161 is provided with a level detection unit 161A. If the state less than −50 dB (silent state) continues for 30 sec or longer, an indicator on the peak level meter is caused to flicker in red, while an alarm is activated to draw the attention of the monitoring operator. The operator then selects the channel to output the sound to the speaker to check whether a malfunction has occurred. The alarming level threshold or detection time can be modified if so desired.

On detection of an abnormality in the sending-out system of a satellite, input to the multi-channel monitor 161 is switched from an output to the IRD (CS-IF) to an output of the QPSK modulator 142 of the current operating system. The speech prior to sending out to the satellite is confirmed by the sole speech selected by the switchboard 341 and the 100-channel peak level meter. If need be, the input to the multi-channel monitor 161 is switched to an output of the QPSK modulator 142 of the spare system to confirm the speech prior to sending out to the satellite by the sole selected speech and by the 100-channel peak level meter.

If there is any further inconvenience, an output of the sending-out server 123, that is the first-order multiplexed stream prior to inputting to the MUX 141, is demultiplexed to extract a one-channel transport stream TS which is decoded by the decoder 164 (FIG. 3) and confirmed by the sole selected speech and by the 100-channel peak level meter.

Since 13 channels per one channel are multiplexed simultaneously by the sending-out server 123, the TS speech monitor 163 simultaneously decodes the TS of up to 13 channels per channel to output the speech of the 13 channels. By providing eight channels of the TS speech monitor 163 and a spare channel of the monitor, it is possible to output the 100-channel speech simultaneously.

The switchboard 341 of the m161 has 100 selection switches each of which is associated with a channel number. On the other hand, an output of the TS speech monitor 163 is physically associated with the output of each sending-out server 123, so that, if 9/8 redundand switching is executed, an output of the TS speech monitor 163 ceases to be associated with the channel number. Thus, in the present embodiment, the channel setter PC 162 is used to set which input is selected and outputted by 100 selection switches of the switchboard 341 of the multi-channel monitor 161 responsive to the switching information.

The channel setter PC 162 controls the switchboard 341 of the sole multi-channel monitor 161. On the other hand, the selection switch controlling setting file is transferred from the two routes of the MXC 144. Thus, the communication with the MXC 144 is over a network employing the LAN as the dedicated network 3, while that with switchboard 341 of the multi-channel monitor 161 is via RS-422 (FIG. 13).

Should there be any inconvenience upstream of the sending-out server 123, it is likely that the material on the proprietary server 121 is responsible for the inconvenience. The suspect material file is directly read out by the OA listening PC 165 from the proprietary server 121 and decoded by the MPEG decoder 166 for checking. In FIG. 3, the OA listening PC 165 and the MPEG decoder 166 are indicated as a reproducing device 265.

It is necessary to check whether an abnormality has occurred in the received sound, recorded matter itself or in the sending-out process. Therefore, the date of occurrence of the abnormality and the channel are specified and a progress table is displayed by the OA listening PC 165. If the material suffering from the abnormality is designated on the progress table, the OA listening PC 165 reads out and reproduces the designated material from the proprietary server 121. This enables a decision to be given on whether or not an abnormality has occurred in the material itself.

The sending-out management system 104 has switching control PCs 182-1 and 181-2. To this switching control PC 182 is sent an output of an in-station timepiece 184 performing a time measurement operation. The sending-out management system 104 also includes OA monitors 181-1 and 181-2 and an alarm PC 183.

The OA monitor PC 181, switching control PC 182, alarm PC 183 and the OA listening PC 185 of the sending-out management system 104 are connected to the MXC 144 of the second-order multiple satellite sending out system 102.

The sending-out management system 104 monitors and switches the sending out from the proprietary server, multi-channel sending-out system 101 and the second-order multiple satellite sending out system 102. The alarms produced in each system are notified in their entirety to the alarm PC in which four different chimes of different sound tones are issued, depending on the alarm level, and the alarm numbers as well as messages are displayed on the display screen of the alarm PC 183. The methods for accommodating the alarms are also indicated for reference in the GUI. The alarm LOG of each system can be seen from the alarm PC 183 so that the process of the occurrence of the inconvenience can be known. The monitor operator of the system is aware of the abnormality by the alarm issued by the alarm PC 183. From the display contents on the alarm PC 183, decision is given on the status of the malfunction and the accommodation and, if need be, a switching operation is performed from the switching control PC 182.

One of the two routes of the switching control PCs 182-1 and 182-2 is set for current operation and its switching operation is set to an input enabling state. The switching control PC 182 cannot be switched in this manner. The switching control PC 182 knows the correct time from the in-station timepiece 184 to set the correct time on the proprietary server 121. Each peripheral refers to the proprietary server 121 to obtain the correct time. The switching control PC 182 performs switching to the spare system of the sending-out server 123 (9/8 redundand switching) and switching between outputs of the QPSK modulator 142 by the selector 143 (A/B switching) subject to the input by the system monitor operator. The switching control PC 182 at this time rewrites the configuration of the proprietary server 121 and subsequently advises each peripheral that the configuration has now been rewritten. Each peripheral is thereby triggered to acquire the new configuration from the proprietary server 121 to switch its operation.

The output switching (A/B switching) of the QPSK modulator 142 is carried out under commands by the switching control PC 182 by having the selector 143 set to remote. However, the selector 143 may also be set to local to effect the switching forcibly on a front panel of the main body portion of the selector 143. In this case, the switching control PC 182 comprehends that the switching has occurred in the main body portion of the selector 143 to switch the configuration of the proprietary server 121 based on this information. On the other hand, the sending-out state of the musical numbers from the sending-out server 123 can be grasped on the OA monitor PC 181.

If an optional channel is selected from the GUI on the OA monitor PC 181, the scheduled sending-out events of the channel (musical number), that is the contents of the progress table, are displayed as a list. The title of the musical number (event) being sent out, performer, performance time and residual time are marked with respective different colors so that the current sending-out state, past sending-out hysteresis and future sending-out schedule can be grasped at a glance. Since the status of the OA monitor PC 181 can be acquired from the sending-out server 123 and the event updating is carried out with the operation of the sending-out server 123 as the reference, it is also possible to grasp the abnormal state of the halting state of the sending-out server 123.

The present invention is not limited to the broadcasting of music over 100 channels and can naturally b applied to data broadcast of any sort of the digitized information data.

Although the MPEG system is used as the compression system in the above-described embodiment, it is merely for the sake of illustration and any other suitable compression method, such as AC-3 or ATRAC, may be used. The present invention may be applied without exploiting compression.

Although the assumed transmission path in the above-described embodiment is a satellite, the transmission path may also be a ground wave, light space, optical cable, coaxial cable or other real-tie transmission path. Alternatively, it may be a storage type transmission path, such as a magnetic tape, optical tape, magnetic disc or an optical disc.

The present invention realizes an automatic sending-out system of multi-channel data broadcast.

The invention claimed is:

1. A multi-channel digital data management apparatus comprising:
    holding means for holding a plurality of materials to be sent;
    sending-out means for sending out the plural materials held on said holding means to a transmission path as multi-channel digital data;
    setting means for setting archiving conditions;
    detection means for detecting, from the plural materials held by said holding means, the materials satisfying the conditions set by said setting means;
    means for archiving the materials detected by said detection means on a storage device separate from the holding means; and
    management means for supervising a progress table of said plural materials to be sent out, the progress table being a database of each broadcasting day for each channel of the multi-channel digital data,
    wherein, when the archived material is again used on said progress table, said management means causes the archived material to be retrieved from the storage device separate from the holding means and to be re-held by said holding means.

2. The multi-channel digital data management apparatus according to claim 1 further comprising:
    designating means for designating from the materials detected by said detecting means, those materials which are to be archived or deleted.

3. A multi-channel digital data management method comprising:
    a holding step for holding a plurality of materials to be sent;
    a sending-out step for sending out the plural materials held on said holding step to a transmission path as multi-channel digital data;
    a setting step for setting archiving conditions;
    a detection step for detecting, from the plural materials held by said holding step, the materials satisfying the conditions set by said setting step;
    a step for archiving the materials detected by said detection step separately from the materials to be sent out; and
    a step for supervising a progress table of said plurality of materials to be sent out, the progress table being a database of each broadcasting day for each channel of the multi-channel digital data,
    wherein, when the archived material is again used on said progress table, the archived material is retrieved and re-held as material to be sent out.

* * * * *